United States Patent [19]

Breward et al.

[11] 4,252,225
[45] Feb. 24, 1981

[54] CLUTCH RELEASE BEARINGS

[75] Inventors: Michael J. Breward, Hitchin; Andrew M. F. Ritchie, Newport Pagnell, both of England

[73] Assignee: SKF Industrial Trading & Development Company B.V., Overtoom, Netherlands

[21] Appl. No.: 716,949

[22] Filed: Aug. 23, 1976

Related U.S. Application Data

[63] Continuation of Ser. No. 460,240, Apr. 11, 1974, abandoned.

[30] Foreign Application Priority Data

Apr. 13, 1973 [GB] United Kingdom ............... 18037/73

[51] Int. Cl.² ............................................ F16D 23/14
[52] U.S. Cl. ....................................................... 192/98
[58] Field of Search .................. 308/233, 235; 192/98, 192/89 B

[56] References Cited

U.S. PATENT DOCUMENTS

| 3,167,164 | 1/1965 | Bland et al. | 192/89 B |
| 3,212,612 | 10/1965 | Sink | 192/89 B |
| 3,365,040 | 1/1968 | Pitner | 192/98 |
| 3,570,638 | 3/1971 | Baker | 192/89 B |

FOREIGN PATENT DOCUMENTS

| 1037203 | 7/1966 | United Kingdom | 192/89 B |
| 1184415 | 3/1970 | United Kingdom | 192/89 B |
| 1240464 | 7/1971 | United Kingdom | 192/98 |

Primary Examiner—George H. Krizmanich
Attorney, Agent, or Firm—Daniel M. Rosen; J. David Dainow

[57] ABSTRACT

A clutch release bearing for attachment to a diaphragm spring declutching member, the bearing comprising an outer race and an inner race, an annular series of rolling elements which roll on the raceway of each race to transmit thrust therebetween, one bearing race having a radially extending shoulder for engagement with a diaphragm spring declutching member and a sleeve attached to that race for rotation therewith about the axis of the clutch, which sleeve extends axially for connection with the side of the diaphragm spring declutching member remote from the bearing, the other bearing race having a radially extending shoulder on which a clutch operating member can act to move the bearing axially to engage and disengage the clutch.

7 Claims, 4 Drawing Figures

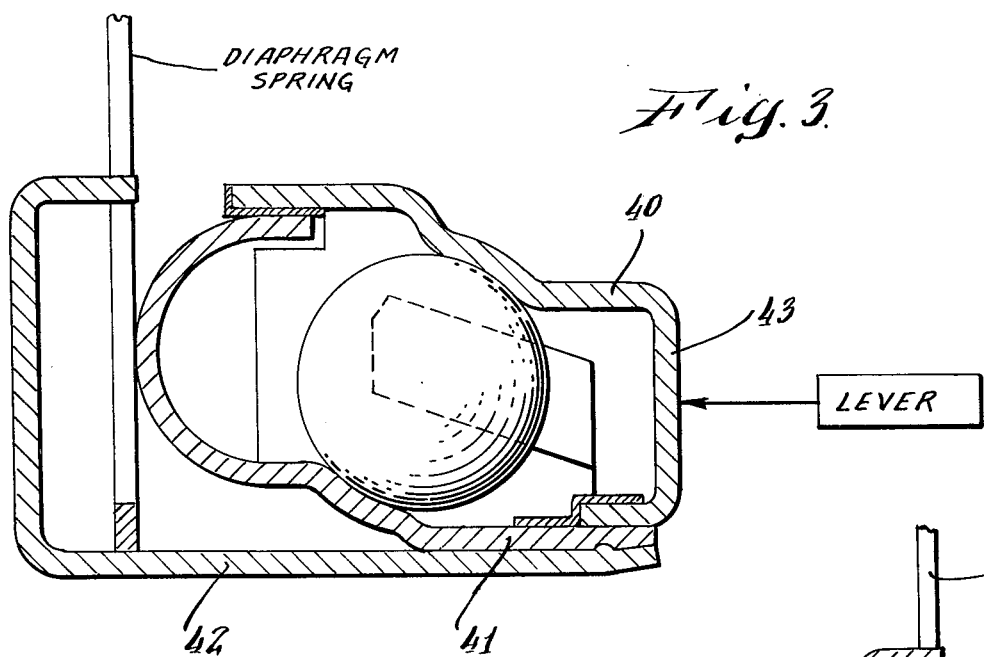
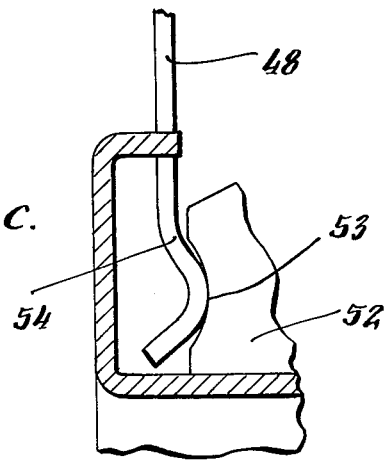
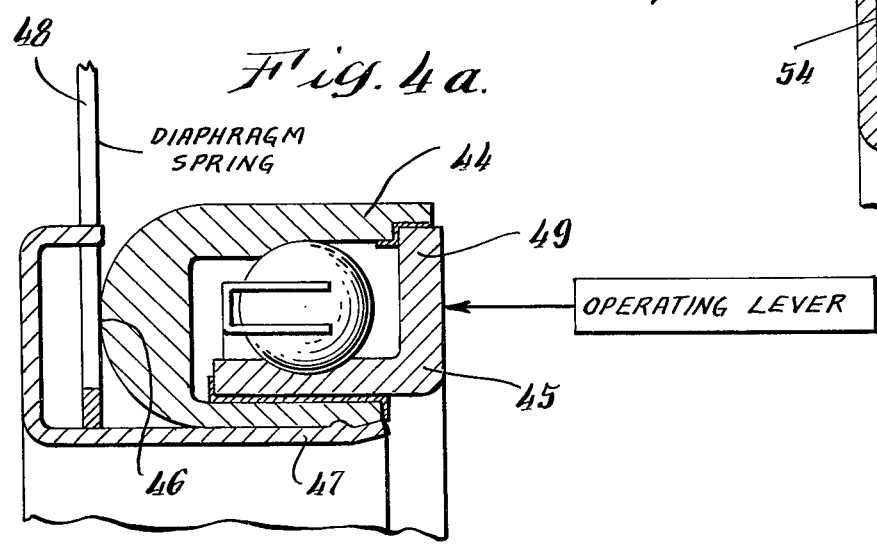
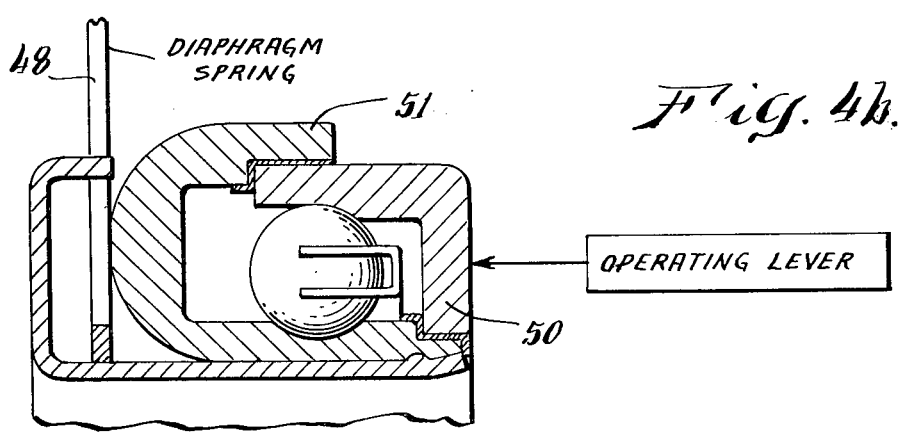

CLUTCH RELEASE BEARINGS

This is a continuation of application Ser. No. 460,240, filed Apr. 11, 1974, now abandoned.

BACKGROUND OF THE INVENTION

This invention relates to a clutch release bearing.

In British Pat. No. 1,240,463 there is claimed a friction clutch such as is used between the engine and gear box of a motor car or a lorry and an operating mechanism which has declutching members each having a radial component of extension and which during declutching operation converge. The friction clutch and operating mechanism comprise a thrust bearing which surrounds the axis of rotation of the friction clutch and is free for radial movement relative to such axis. The radial movement of the thrust bearing is limited to ensure that a first race of the thrust bearing will contact all the declutching members adjacent their inner ends. The arrangement is such that on declutching operation the first race of the thrust bearing, if it is not already in contact with the declutching members, is brought into contact with the declutching members and then the thrust bearing by radial movement with respect to the said axis of rotation is permitted to adopt a position determined in part by the declutching members.

In British Pat. No. 1,240,464 there is claimed a clutch release bearing which is a rolling bearing having an inner race and an outer race and wherein one race extends axially beyond the other and has a flange on its axial extension and wherein the other race extends axially beyond the one and has a shoulder on the external surface of its axial extension which shoulder is rounded in radial cross-section and is spaced from and faces towards the end of the last mentioned axial extension, and wherein the last mentioned axial extension also has an outwardly extending flange between the shoulder and the end of the last mentioned axial extension which flange is spaced from the shoulder so that a groove is provided between the flange and the shoulder.

The present invention provides a clutch release bearing for attachment to a diaphragm spring declutching member. The bearing comprises an outer race and an inner race and an annular series of rolling elements which roll on the raceway of each race to transmit thrust therebetween. One bearing race has a radially extending shoulder for engagement with a diaphragm spring declutching member and a sleeve attached to that race for rotation therewith about the axis of the clutch, which sleeve extends axially for connection with the side of diaphragm spring declutching member remote from the bearing. The other bearing race has a radially extending shoulder on which a clutch operating member can act to move the bearing axially to engage and disengage the clutch.

According to a feature of the invention a limb may extend axially from the shoulder on the one race radially inwardly of the outer race, the sleeve being attached to and extending along the limb beyond the shoulder, which sleeve is provided with a radial flange having means for connection to the diaphragm spring declutching member. If this feature is adopted said means may comprise a plurality of axial projections circumferentially spaced around the flange and extending towards the shoulder on the one race, to fit into slots provided in the diaphragm spring.

According to a further feature of the invention the radial flange on the sleeve may extend radially beyond that part of the shoulder on the one race which is engageable with a diaphragm spring declutching member.

According to a still further feature of the invention the shoulder on the one race may be provided with a turned-over end portion to form a groove into which a suitably shaped inner periphery of a diaphragm spring declutching member can engage, the mouth of the groove facing radially outwardly and the sleeve being provided with an outwardly turned flange which is connected to the turned-over end portion of the shoulder. If this feature is adopted the sleeve may extend axially away from the shoulder on the one race to cover the space between the shoulder and the inner race.

According to another feature of the invention the inner and outer bearing races may be made from solid metal. If this feature is adopted, the one race may be provided with a concave groove on one axial face to co-operate with a suitably shaped inner periphery of a diaphragm spring.

According to a still further feature of the invention the one bearing race may be the outer bearing race.

Another aspect of the invention provides the combination of a clutch release bearing as defined in any of the six immediately preceding paragraphs and a diaphragm spring declutching member.

Yet another aspect of the invention provides a clutch when fitted with the combination as defined in the immediately preceding paragraph.

Several embodiments of a clutch release bearing according to the invention will now be described, by way of example, with reference to the accompanying drawings.

DESCRIPTION OF THE DRAWINGS AND THE PREFERRED EMBODIMENTS

FIG. 3 is an axial section through a clutch release bearing similar to that shown in FIG. 1 of the drawings;

FIG. 4a is an axial section through a clutch release bearing having solid metal race rings;

FIG. 4b is an axial section through a bearing similar to that shown in FIG. 4a, and FIG. 4c is a partial section of a further modification of a clutch release bearing having solid metal race rings.

Figure 1:
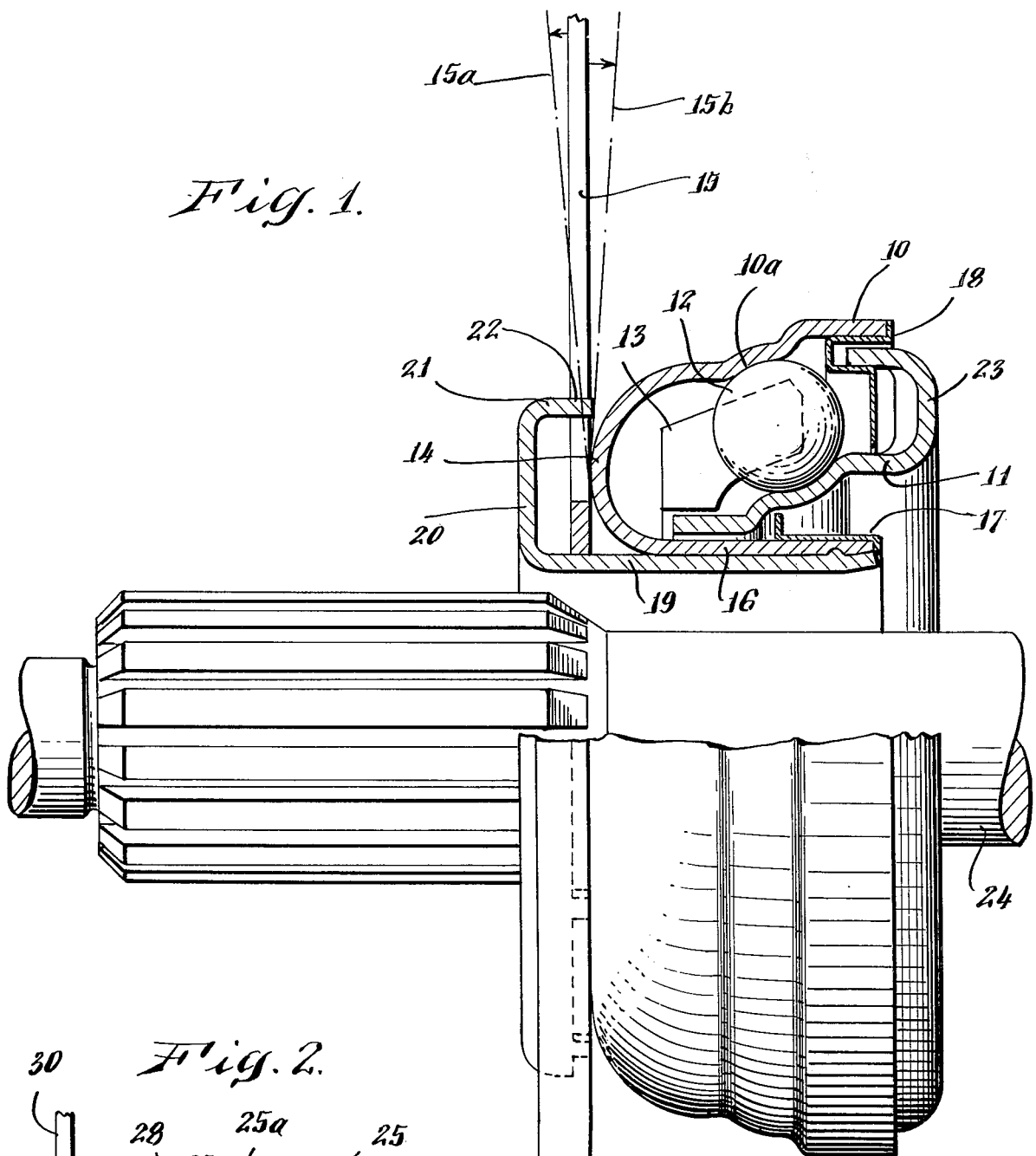
FIG. 1 shows a clutch release bearing in partial axial section in engagement with a diaphragm spring declutching member.

Referring first to FIG. 1 of the drawings there is shown a clutch release bearing comprising a sheet metal outer race 10 and a sheet metal inner race 11. An annular series of rolling elements 12 retained in a bearing cage 13 is arranged to roll on the raceway 10a, 11a of each race 10, 11 respectively to transmit thrust therebetween. The outer race 10 is formed to provide an integral shoulder 14 which engages one face of an annular diaphragm spring declutching member 15. A limb 16 of the outer race 10, integral with the shoulder 14, extends axially away from the member 15 and radially inwardly of the inner race 11. A sealing member 17 is attached to the limb 16 so as to seal the radial space between the limb and the inner end of the inner race 11. At the radially outer end of the outer race a further sealing member 18 is attached which extends radially inwardly to seal between the radially outer ends of the outer and inner races 10, 11 respectively.

A sheet metal sleeve 19 which surrounds the drive shaft 24 with clearance is connected by peening or other suitable method to the free end of limb 16 and extends axially beyond the shoulder 14 and through the aperture in the annular diaphragm spring 15. The sleeve 19 is provided with a radially extending flange 20 which is formed with a rim 21 extending towards the shoulder 14 terminating with a plurality of circumferentially spaced projections 22 which engage in slots provided in the diaphragm spring 15. In this embodiment the radial flange 20 extends radially beyond the point of engagement of the shoulder 14 with the diaphragm spring 15. An interference fit is achieved between the rim 21 and the diaphragm spring 15 by controlling the position of sleeve 19 in an axial direction during assembly with the result that the diaphragm spring is slightly deformed. The inner bearing race 11 is also formed with an integral shoulder 23 on which a clutch operating member (not shown) can act to move the bearing axially.

In operation to engage the clutch, the clutch operating member is actuated to allow the bearing to move to the right of the position shown in FIG. 1 so that the diaphragm spring 15 is flexed and adopts the position shown in broken lines 15*a*. In order to disengage the clutch the operating level causes the bearing to be moved to the left of the position shown in FIG. 1 so that the diaphragm spring 15 is flexed in the opposite direction and adopts the position shown in broken lines 15*b*.

The clutch release bearing is free for radial movement relative to the shaft and the radial movement of the bearing is limited to maintain it out of contact with the shaft. The bearing assembly will automatically re-center itself with respect to the drive shaft axis if it is displaced, for example, due to shock loads.

Figure 2:
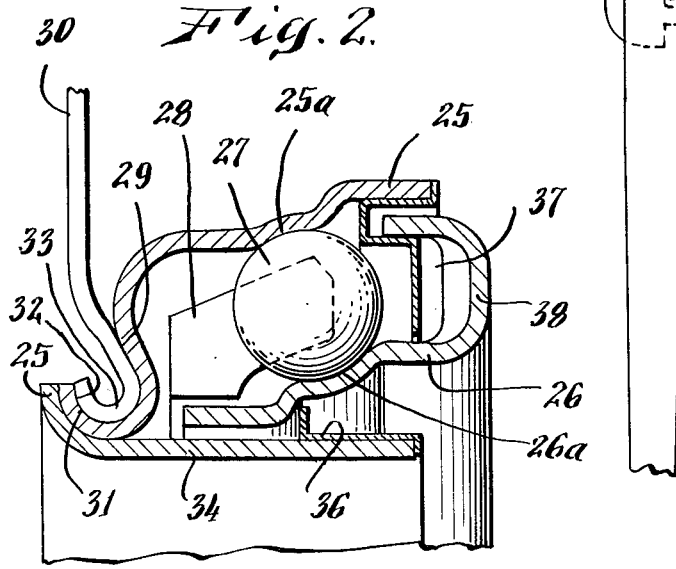
FIG. 2 is an axial section through a modified clutch release bearing.

Referring now to FIG. 2 of the drawings there is shown a modified construction of a clutch release bearing in accordance with the invention. The bearing comprises a sheet metal outer race 25 and a sheet metal inner race 26. An annular series of rolling elements 27 retained in a bearing cage 28 is arranged to roll on the raceway 25*a*, 26*a* of each race 25, 26 respectively to transmit thrust therebetween.

The outer race 25 is formed to provide an integral shoulder 29 which engages one face of an annular diaphragm spring declutching member 30. The shoulder 29 is extended to provide a turned-over end portion 31 which forms a groove 32 the mouth of which faces radially outwardly. The radially inner periphery of the annular diaphragm spring 30 is turned-over to form a rim 33 which is hook-shaped in cross-section and which is engageable with the groove 32. A sheet metal sleeve 34 which surrounds the drive shaft (not shown) with clearance is provided with an outwardly turned flange 35 which is connected to the turned-over end portion 31 of the shoulder extension and the sleeve extends axially away from the diaphragm spring to cover the space between the outer race 25 and the inner race 26. A seal member 36 is attached to the free end of sleeve 34 and seals the space between the sleeve end and the radially inner end of the inner race 26. A further seal member 37 is attached to the radially outer end of the outer race 25 and extends radially inwardly to seal between the radially outer ends of the outer and inner races 25, 26 respectively.

The inner race 26 is also formed with an integral shoulder 38 on which a clutch operating member (not shown) can act to move the bearing axially. In operation the diaphragm spring will flex in a similar manner to engage and disengage the clutch as described with reference to FIG. 1 of the drawings.

FIG. 3 of the drawings shows a clutch release bearing having a sheet metal outer race 40 and a sheet metal inner race 41. The bearing of FIG. 3 is similar to that shown in FIG. 1 except that the sheet metal sleeve 42 is attached to the inner bearing race 41 and the outer bearing race 40 has a radially extending shoulder 43 on which a clutch operating member can act.

Referring to FIG. 4*a* of the drawings there is shown a clutch release bearing in which both the outer race 44 and the inner race 45 are made from solid metal. The outer race 44 is provided with a radiused shoulder 46 which engages one face of an annular diaphragm spring declutching member 48.

A sheet metal sleeve 47 extends from a radially inner limb of the outer race 44 and has projections which engage the diaphragm spring 48 as described with reference to FIG. 1 of the drawings. The inner race 45 has a radially extending shoulder 49 on which a clutch operating member can act to move the bearing axially. FIG. 4*b* shows a clutch release bearing which is similar to that shown in FIG. 4*a* except that the inner race 51 is provided with the radiused shoulder which engages one face of the diaphragm spring and the outer race 50 has a radially extending shoulder on which a clutch operating member can act.

In FIG. 4*c* of the drawings part of another clutch release bearing embodying the invention is shown which has a solid metal inner race 52 which is provided with a concave groove 53 in one end face to co-operate with a hook-shaped rim on a diaphragm spring 54 similar to that described with reference to FIG. 2 of the drawings. 9n

What is claimed is:

1. A clutch release bearing for attachment to a diaphragm spring declutching member, the bearing comprising an outer race and an inner race, an annular series of rolling elements which roll on the raceway of each race to transmit thrust therebetween, one bearing race having a radially extending shoulder engaging said diaphragm spring declutching member, a sleeve attached to said one bearing race for rotation therewith about the axis of the clutch, said sleeve axially extending into direct connecting engagement with the side of said diaphragm spring declutching member remote from the bearing, the other bearing race being a single element having said rolling elements rolling along the inner face thereof and the outer face thereof being a radially extending shoulder for directly engaging a clutch operating member, said clutch operating member operable to move the bearing axially to engage and disengage the clutch.

2. A clutch release bearing as claimed in claim 1 wherein a limb extends axially from said shoulder on said one race radially toward said other race, said sleeve being attached to an extension along said limb of said one race beyond said shoulder, said sleeve being provided with a radial flange having means thereon for said connection to said diaphragm spring declutching member.

3. In a clutch release bearing for attachment to a diaphragm spring of a declutching member and operable with a clutch operating member for moving said bearing along a central axis through said bearing, said spring having a front side facing the bearing and a rear side, the bearing having opposite ends and comprising outer and inner races which define outer and inner raceways respectively, the outer raceway being radially outward of the inner raceway, one of these races being designated the first race and the other being designated the second race, and a plurality of rolling elements situated between said raceways, said first race further comprising (a) a radially extending first shoulder for engaging the front side of said spring, (b) a cylindrical limb extending from said first shoulder toward said second race, and (c) a sleeve extending from said limb away from said second race and toward and past said first shoulder and said front side of the spring to said rear side thereof, said sleeve further comprising a radially directed flange which engages said rear side of said spring, said sleeve being rotatable with said first race about said central axis, said second race further comprising a radially extending second shoulder for engaging said clutch operating member, said first and second race defining walls situated respectively radially outward and inward of the rolling elements, and said first and second shoulders defining walls situated at opposite ends of said bearing, these walls together defining a housing which generally surrounds said rolling elements.

4. A clutch release bearing according to claim 3 wherein said spring comprises a plurality of radially directed arms defining a radial slot between each two adjacent arms, and said flange adjacent said rear side of the spring comprises a plurality of circumferentially spaced projections extending axially toward said spring for engaging said slots therein.

5. A clutch release bearing according to claim 3 wherein said first shoulder of said first race engages said spring at a first radial distance from said central axis, and said radially directed flange on said sleeve engages said spring at a radial distance greater than said first radial distance.

6. A clutch release bearing according to claim 3 wherein there is an axial space defined between (i) said first shoulder of said first race and (ii) said second race, and said limb extending axially from said first race covers said axial space.

7. A clutch release bearing according to claim 3 wherein said first race is said outer race.

* * * * *

UNITED STATES PATENT AND TRADEMARK OFFICE
CERTIFICATE OF CORRECTION

PATENT NO. : 4,252,225

DATED : February 24, 1981

INVENTOR(S) : Michael J. Breward, et al.

It is certified that error appears in the above—identified patent and that said Letters Patent is hereby corrected as shown below:

Column 3, line 25, "level" should read -- lever --.

Claims 1 and 2 should read as shown on the attached sheets.

UNITED STATES PATENT AND TRADEMARK OFFICE
CERTIFICATE OF CORRECTION

PATENT NO. : 4,252,225

DATED : February 24, 1981

INVENTOR(S) : Michael J. Breward, et. al

It is certified that error appears in the above—identified patent and that said Letters Patent is hereby corrected as shown below:

--1. A clutch release bearing for attachment with a friction clutch comprising an annular spring release member formed of a plurality of radially inwardly directed arms defining a wall having front and rear sides with a plurality of slots between the arms, said arms having ends which define a central bore in said wall, said clutch release bearing comprising an inner race member and an outer race member which define inner and outer raceways respectively, the outer raceway being radially outward of the inner raceway, and a plurality of rolling elements located between said raceways which are inclined to provide a combined axial and radial bearing, said race members being respectively formed of solid metal, said outer race member having a portion thereof extending axially away from said rolling elements to form a sleeve projection adapted to be freely inserted through the bore of said spring release member to pass behind the rear side of said wall of said spring release member and engage therewith, and another portion defining a wall extending radially and engaging the front side of said spring release member to position the rolling elements axially from said spring release member, the arms of said spring release member having free ends adjacent said sleeve projection.--

--2. In a clutch release bearing operable with a friction clutch which includes an annular spring release member having a plurality of radially inwardly directed arms whose inner ends define a central bore, said arms forming a flexible wall having front and rear surfaces facing toward and away respectively from said bearing, said bearing including an inner race member and an outer race member which define inner and outer raceways respectively, the outer raceway being radially outward of the inner raceway, and a plurality of rolling elements

UNITED STATES PATENT AND TRADEMARK OFFICE
CERTIFICATE OF CORRECTION

PATENT NO. : 4,252,225

DATED : February 24, 1981

INVENTOR(S) : Michael J. Breward, et. al

It is certified that error appears in the above—identified patent and that said Letters Patent is hereby corrected as shown below:

located between said raceways, the improvement in combination therewith wherein said race members are each formed of solid material, each raceway is inclined for providing combined axial and radial bearing surfaces, and said outer race member further comprises a first wall portion extending from said inclined raceway thereof toward and engaging said front surface of said flexible wall for positioning said rolling elements axially from said spring release member, and a second wall portion which extends from said first portion as an annular sleeve toward said front surface of said flexible wall and is freely insertable through said central bore thereof for engaging said rear surface thereof.--

Signed and Sealed this

Eleventh Day of May 1982

[SEAL]

Attest:

GERALD J. MOSSINGHOFF

Attesting Officer

Commissioner of Patents and Trademarks